United States Patent
Yang et al.

(10) Patent No.: US 10,992,527 B2
(45) Date of Patent: Apr. 27, 2021

(54) SUBFRAME CONFIGURATION METHOD AND DEVICE

(71) Applicant: ZTE CORPORATION, Shenzhen (CN)

(72) Inventors: Jin Yang, Shenzhen (CN); Shuanghong Huang, Shenzhen (CN); Youxiong Lu, Shenzhen (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 16/347,351

(22) PCT Filed: Nov. 2, 2017

(86) PCT No.: PCT/CN2017/109158
§ 371 (c)(1),
(2) Date: May 3, 2019

(87) PCT Pub. No.: WO2018/082620
PCT Pub. Date: May 11, 2018

(65) Prior Publication Data
US 2020/0052966 A1 Feb. 13, 2020

(30) Foreign Application Priority Data
Nov. 3, 2016 (CN) .......................... 201610959395.7

(51) Int. Cl.
*H04W 4/40* (2018.01)
*H04L 12/24* (2006.01)
(Continued)

(52) U.S. Cl.
CPC ......... *H04L 41/0813* (2013.01); *G08G 1/162* (2013.01); *G08G 1/166* (2013.01);
(Continued)

(58) Field of Classification Search
CPC ... H04W 4/70; H04W 72/0446; H04W 28/04; H04W 4/40; H04W 72/02;
(Continued)

(56) References Cited

U.S. PATENT DOCUMENTS 8,737,346 B2    5/2014 Che et al.
9,722,839 B2 *  8/2017 Zhao ................. H04W 56/0045
(Continued)

FOREIGN PATENT DOCUMENTS

CN    105247799 A     1/2016
WO    2009156838 A1   12/2009
WO    2015156604 A1   10/2015

OTHER PUBLICATIONS

International Search Report dated Dec. 28, 2017 for International Application No. PCT/CN2017/109158, 5 pages.
(Continued)

*Primary Examiner* — Phuc H Tran
(74) *Attorney, Agent, or Firm* — Knobbe, Martens, Olson & Bear, LLP

(57) ABSTRACT

Provided are a subframe configuration method and device. The method includes: determining a configuration of second type subframes according to a configuration of first type subframes and a bitmap sequence of subframe configuration of a resource pool, where the second type subframes are reserved subframes, and mapping of the bitmap sequence is not performed on the reserved subframes; and mapping the bitmap sequence according to the configuration of the first type subframes and the configuration of the second type subframes.

11 Claims, 4 Drawing Sheets

Determining a configuration of second type subframes according to a configuration of first type subframes and a bitmap sequence of subframe configuration of a resource pool, where the second type subframes are reserved subframes, and mapping of the bitmap sequence is not performed on the reserved subframes — S202

Mapping the bitmap sequence of the subframe configuration of the resource pool according to the configuration of the first type subframes and the configuration of the second type subframes — S204

(51) Int. Cl.
*G08G 1/16* (2006.01)
*H04W 56/00* (2009.01)
*H04W 72/04* (2009.01)

(52) U.S. Cl.
CPC .......... *H04W 4/40* (2018.02); *H04W 56/001* (2013.01); *H04W 72/0446* (2013.01)

(58) Field of Classification Search
CPC .......... H04W 72/0406; H04W 72/042; H04W 72/12; H04W 72/1263; H04W 72/1278; H04W 72/14; H04W 76/14; H04W 92/16; H04W 4/44; H04W 4/46; H04W 4/48; H04W 4/50; H04W 56/001; H04W 92/18; H04L 1/08; H04L 1/1614; H04L 5/00; H04L 5/0053; H04L 5/0092; H04L 1/1671; H04L 1/1854; H04L 2001/0097; H04L 41/0813; H04L 5/0055; H04L 5/0094; G08G 1/162; G08G 1/166
See application file for complete search history.

(56) References Cited

U.S. PATENT DOCUMENTS

| | | | |
|---|---|---|---|
| 2011/0268053 A1* | 11/2011 | Che | H04L 1/1621 370/329 |
| 2016/0156494 A1 | 6/2016 | Zhao et al. | |
| 2017/0027014 A1 | 1/2017 | Chae et al. | |
| 2017/0034822 A1* | 2/2017 | Chae | H04W 4/70 |
| 2017/0279562 A1* | 9/2017 | Chae | H04J 1/02 |
| 2019/0124678 A1* | 4/2019 | Harada | H04W 72/042 |

OTHER PUBLICATIONS

Written Opinion of the International Searching Authority dated Dec. 28, 2017 for International Application No. PCT/CN2017/109158, 3 pages.
Extended European Search Report of corresponding Patent Application No. 17867988.2—12 pages (dated Apr. 23, 2020).
Ericsson, "Pool design for V2V", 3GPP TSG RAN WG1 Meeting #86, R1-166974—3 pages (dated Aug. 12, 2016).
LG Electronics, "Summary of Wednesday V2V offline discussions", 3GPP TSG RAN WG1 Meeting #86, R1-168247—3 pages (dated Aug. 28, 2016).
Ericsson, "Pool design for V2V", 3GPP TSG RAN WG1 Meeting #86bis, R1-1609726—3 pages (dated Oct. 9, 2016).
LG Electronics, "Corrections on the set of reserved subframes in SL TM 4", 3GPP TSG RAN WG1 Meeting #86bis, R1-1609180—3 pages (dated Oct. 9, 2016).

* cited by examiner

SUBFRAME CONFIGURATION METHOD AND DEVICE

CROSS REFERENCE TO RELATED APPLICATIONS

This application is a U.S. national phase application of international patent application No. PCT/CN2017/109158, filed on Nov. 2, 2017 which claims priority to a Chinese patent application No. 201610959395.7 filed on Nov. 3, 2016, the disclosures of each of which are incorporated herein by reference in their entireties.

TECHNICAL FIELD

The present disclosure relates to communications and, in particular, to a subframe configuration method and device.

BACKGROUND

In a device-to-device (D2D) communication system in a related art, when a service needs to be transmitted between user equipments (UEs), service data between the UEs is directly transmitted from a data source UE to a target UE through an air interface without being forwarded by a base station. FIG. 1 is a schematic diagram illustrating a D2D communication structure in the related art. As shown in FIG. 1, a radio link between D2D UEs is referred to as a sidelink (SL). The D2D communication mode has distinct characteristics from the traditional cellular system communication mode. For short-distance communication users capable of using the D2D communication mode, the D2D transmission not only saves radio spectrum resources, but also decreases the data transmission pressure of a core network, thereby reducing occupied system resources, increasing spectrum efficiency of the cellular communication system, reducing the transmitting power consumption of a terminal and saving network operation costs to a large extent. A Vehicle-to-Everything (V2X) system refers to a system which provides vehicle information through devices mounted on vehicles such as sensors, vehicle-mounted terminals and electronic tags, implements Vehicle-to-Vehicle (V2V), Vehicle-to-Pedestrian (V2P) and Vehicle-to-Infrastructure (V2I) intercommunication by using various communication technologies, effectively uses information by way of extraction, sharing, etc. on an information network platform, and effectively controls vehicles and provides comprehensive services for vehicles. The V2X may perform communication-based vehicle information notification and collision hazard warning, and, through advanced wireless communication technologies and a new generation of information processing technologies, performs real-time information interactions between vehicles and between vehicles and roadside infrastructure, informs each other of the current status (including position, speed, acceleration and traveling path of the vehicle) and the learned road environment information, cooperatively senses road hazard conditions and provides various collision warning information in time to prevent road traffic accidents, and thus become a new way to solve road traffic safety problems.

In recent years, with the development of new mobile communication technologies, it has become a research hotspot to solve V2X communications on the basis of a Long Term Evolution (LTE) system. The D2D communication mode may be applied to short-distance communications between vehicles as a special application of the D2D communication mode.

However, there is a problem in the process of the D2D/V2V communication: when subframes included in a resource pool are configured through repeated mappings of a designated bitmap sequence, the mapping of a bitmap may not match system subframes in the LTE system, thus causing unstable delay when the UE transmits D2D/V2V information in the subframes included in the resource pool.

In view of the above problem in the related art, no effective solution has yet been proposed.

SUMMARY

Embodiments of the present disclosure provide a subframe configuration method and device, which can solve the problem in the related art that the delay of subframes included in a resource pool is unstable during information transmission.

According to an embodiment of the present disclosure, a subframe configuration method is provided. The method includes: determining a configuration of second type subframes according to a configuration of first type subframes and a bitmap sequence of subframe configuration of a resource pool, where the second type subframes are reserved subframes, and mapping of the bitmap sequence is not performed on the reserved subframes; and mapping the bitmap sequence of the subframe configuration of the resource pool according to the configuration of the first type subframes and the configuration of the second type subframes.

According to another embodiment of the present disclosure, a subframe configuration device is provided. The device includes: a determining module, which is configured to determine a configuration of second type subframes according to a configuration of first type subframes and a bitmap sequence of subframe configuration of a resource pool, where the second type subframes are reserved subframes, and mapping of the bitmap sequence is not performed on the reserved subframes; and a mapping module, which is configured to map the bitmap sequence of the subframe configuration of the resource pool according to the configuration of the first type subframes and the configuration of the second type subframes.

According to yet another embodiment of the present disclosure, a storage medium is further provided. The storage medium is configured to store program codes for executing following steps:

determining a configuration of second type subframes according to a configuration of first type subframes and a bitmap sequence of the subframe configuration of a resource pool, where the second type subframes are reserved subframes, and mapping of the bitmap sequence is not performed on the reserved subframes; and mapping the bitmap sequence of the subframe configuration of the resource pool according to the configuration of the first type subframes and the configuration of the second type subframes.

Through the solution in part of the embodiments of the present disclosure, the configuration of second type subframes is determined according to the configuration of first type subframes and a subframe configuration bitmap sequence of a resource pool, where the second type subframes are reserved subframes, and no mapping of the bitmap sequence is performed on the reserved subframes; and the subframe configuration bitmap sequence of the resource pool is mapped according to the configuration of the first type subframes and the configuration of the second type subframes. By setting the second type subframes configuration, the quantity of subframes which can be used for mapping the resource pool subframe bitmap sequence is exactly an integer multiple of a length of the bitmap sequence, continuous bitmap mapping indications are implemented, and the subframe configuration in the resource pool is repeated cyclically, thereby benefiting stable delay of the UE using the subframes in the resource pool, and guaranteeing continuity of scheduling and usage of resources. Therefore, the problem in the related art that the delay of subframes included in the resource pool is unstable during information transmission is solved.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. In the drawings.

DETAILED DESCRIPTION

The present disclosure will be described hereinafter in detail with reference to the drawings and in conjunction with embodiments. It is to be noted that if not in collision, the embodiments and features therein in the present application may be combined with each other.

It is to be noted that the terms "first", "second" and the like in the description, claims and above drawings of the present disclosure are used to distinguish between similar objects and are not necessarily used to describe a particular order or sequence.

Embodiment 1

Figure 1:
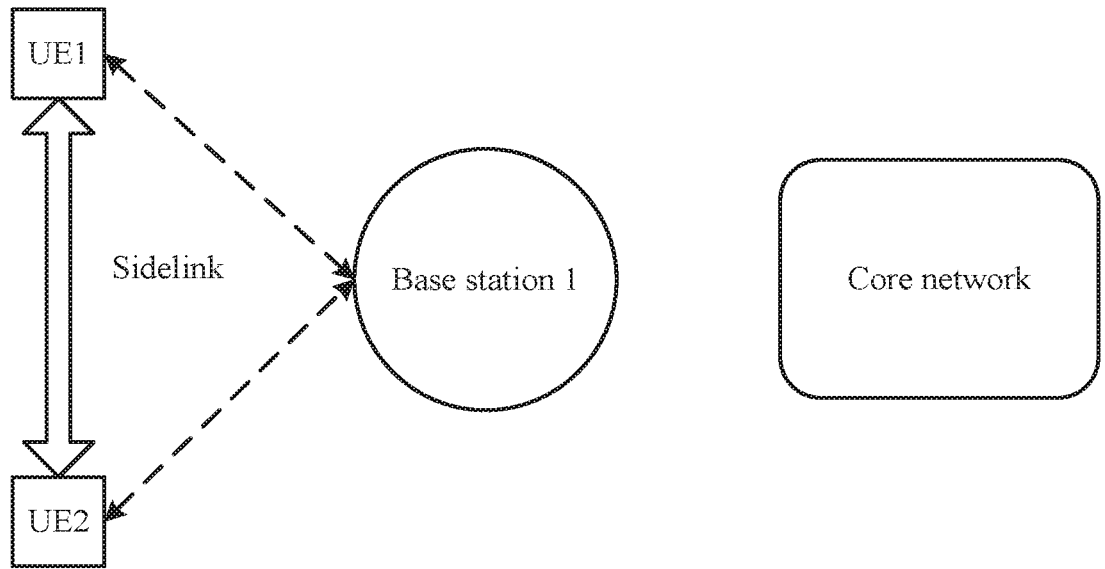
FIG. 1 is a schematic diagram illustrating a D2D communication structure in the related art of the present disclosure.
Figure 2:
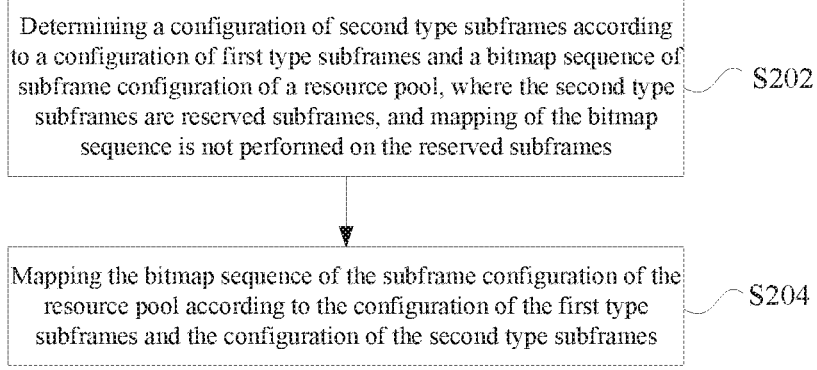
FIG. 2 is a flowchart illustrating a subframe configuration method according to an embodiment of the present disclosure.

This embodiment provides a subframe configuration method executed on a network structure shown in FIG. 1. FIG. 2 is a flowchart illustrating a subframe configuration method according to an embodiment of the present disclosure. As shown in FIG. 2, the method includes steps described below.

In step S202, a configuration of second type subframes is determined according to a configuration of first type subframes and a bitmap sequence of subframe configuration of a resource pool, where the second type subframes are reserved subframes. As a preferable implementation mode, mapping of the bitmap sequence is not performed on the reserved subframes. That is, no mapping of the bitmap sequence is performed on the second type subframes.

In step S204, the bitmap sequence of subframe configuration of the resource pool is mapped according to the configuration of the first type subframes and the configuration of the second type subframes.

Through the steps described above, configuration of second type subframes is determined according to configuration of first type subframes and a bitmap sequence of subframe configuration of a resource pool, where the first type subframes refer to subframes on which mapping of the bitmap sequence is not performed within a range of system subframe sequence numbers, and the configuration of the second type subframes refer to the quantity and/or positions of the second type subframes within the range of system subframe sequence numbers. By setting the second type subframes configuration, the quantity of subframes which can be used for mapping the resource pool subframe bitmap sequence is exactly an integer multiple of a length of the bitmap sequence, continuous bitmap mapping indications are implemented, and the subframe configuration in the resource pool is repeated cyclically, thereby benefiting stable delay of a user equipment (UE) using the subframes in the resource pool, and guaranteeing continuity of scheduling and usage of resources. Therefore, the problem in the related art that the delay of subframes included in the resource pool is unstable during information transmission is solved.

Optionally, the above steps may, but may not necessarily, be executed by a base station or a terminal, such as a device-to-device (D2D) terminal.

Figure 3:
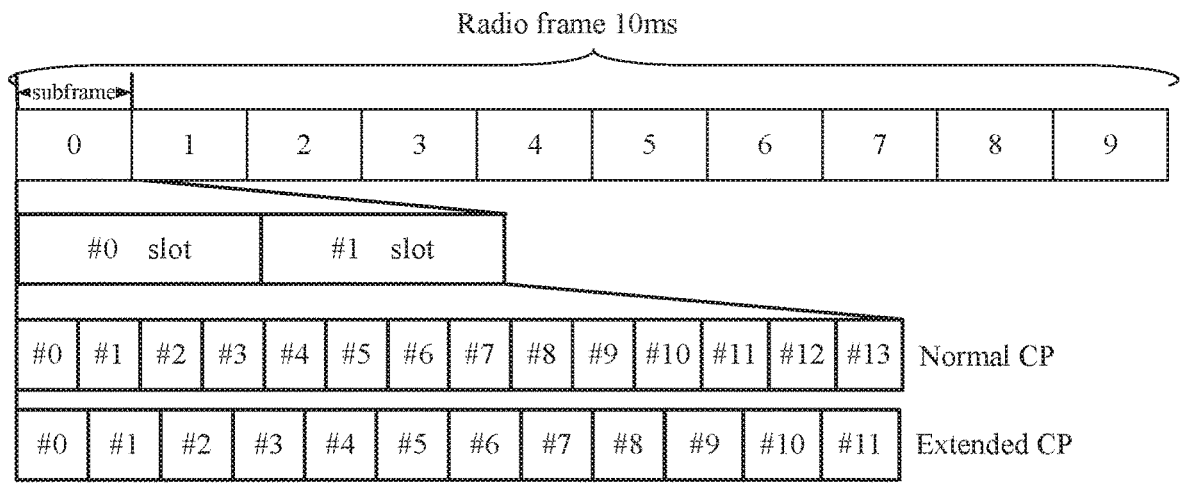
FIG. 3 is a schematic diagram one illustrating a frame structure in an LTE system in the related art of the present disclosure.
Figure 4:
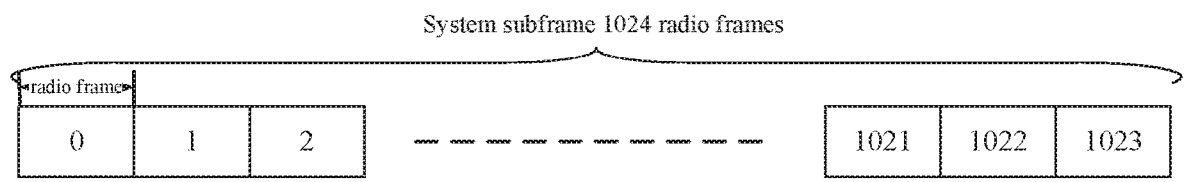
FIG. 4 is a schematic diagram two illustrating a frame structure in an LTE system in the related art of the present disclosure.

FIG. 3 is a schematic diagram one illustrating a frame structure in an LTE system in the related art of the present disclosure. As shown in FIG. 3, in a Long Term Evolution (LTE) system in the related art, each radio frame is 10 ms, including 10 subframes. One subframe is 1 ms, which is divided into 2 slots of 0.5 ms. FIG. 4 is a schematic diagram two illustrating a frame structure in an LTE system in the related art of the present disclosure. As shown in FIG. 4, the radio frames in the system are numbered successively from 0 to 1023. That is, a range of system subframe sequence numbers is [0, 10239], totally including 10240 subframes.

In the D2D communication system, data transmission is directly performed between UEs. The transmitting UE may obtain physical sidelink control channel (PSCCH) and physical sidelink shared channel (PSSCH) resources for D2D communications according to the scheduling of a network side, and may also contend for and select resources in the given PSCCH and PSSCH resource pools for D2D communication control and data information transmission.

In this embodiment, the first type subframes include sidelink (SL) synchronization subframes and/or offset subframes. The SL synchronization subframes refer to subframes for sending SL synchronization signals, and the offset subframes refer to Ne continuous subframes starting from a subframe with a smallest system subframe sequence number, where Ne is a quantity of offset subframes, the offset subframe quantity is configured by the network side or is predefined in the system, and Ne is a non-negative integer. The second type subframes refer to a certain quantity of reserved subframes on the basis of the configuration of the first type subframes, for ensuring that the bitmap sequence of subframe configuration of the resource pool can be repeatedly mapped an integer number of times within the range of system subframe sequence numbers. As the reserved subframes, no mapping of the bitmap sequence is performed on the second type subframes. The configuration of the second type subframes refer to the quantity and/or positions of the second type subframes within the range of system subframe sequence numbers.

Optionally, the step that configuration of second type subframes is determined according to configuration of first type subframes and a bitmap sequence of subframe configuration of a resource pool includes following two manners:

determining the quantity Nr of the second type subframes according to the quantity $N_0$ of the first type subframes and a length L of the bitmap sequence, where Nr is equal to a modulo calculation result of the quantity Ns of basic subframes by the length L of the bitmap sequence, that is Nr=Ns mod L, mod is a modulo operator, the basic subframes are remaining subframes obtained by excluding the first type subframes from all system subframes within a range of system subframe sequence numbers, $N_0$ and Nr are non-negative integers, and L is a positive integer; and determining positions of the second type subframes according to a rule which is configured by the network side or is predefined. Optionally, the rule includes at least one of:

starting from a subframe with a smallest sequence number in system subframes, Nr continuous subframes whose subframe sequence numbers are incremented are noted as the second type subframes, where Nr is the quantity of the second type subframes;

starting from a subframe with a biggest sequence number in the system subframes, Nr continuous subframes whose subframe sequence numbers are decremented are noted as the second type subframes;

in the system subframes, starting from a first designated subframe, Nr continuous subframes whose subframe sequence numbers are incremented or decremented are noted as the second type subframes, where the first designated subframe is predefined in the system or is indicated by network side, and the first designated subframe may be a certain fixed subframe.

in sequentially numbered basic subframes, starting from a subframe with a smallest sequence number in the basic subframes, Nr continuous subframes whose subframe sequence numbers are incremented are noted as the second type subframes, where the basic subframes are remaining subframes obtained by excluding the first type subframes from all system subframes within a range of system subframe sequence numbers;

in the sequentially numbered basic subframes, starting from a subframe with a biggest sequence number in the basic subframes, Nr continuous subframes whose subframe sequence numbers are decremented are noted as the second type subframes;

in the sequentially numbered basic subframes, starting from a second designated subframe, Nr continuous subframes whose subframe sequence numbers are incremented or decremented are noted as the second type subframes, where the second designated subframe is predefined in the system or is indicated by the network side, and the second designated subframe may be a certain fixed subframe;

in the sequentially numbered basic subframes, subframes whose subframe sequence numbers are a+b*T are noted as the second type subframes, where T is equal to a result of rounding down a division of Ns by Nr, that is T=floor(Ns/Nr), floor(·) is a floor function, a is a non-negative integer, and b=[0, 1, 2, . . . Nr−1] or b=[1, 2, 3, . . . Nr];

in the sequentially numbered basic subframes, subframes whose subframe sequence numbers are a+b*L are noted as the second type subframes, where L is a length of the bitmap sequence; and subframes with system subframe sequence numbers $S_i$ are predefined as the second type subframes, where i=[0, 1, 2, . . . Nr−1].

In this embodiment, the network side includes at least one of: an evolved NodeB (eNB), a relay node (RN), a multicell coordination entity (MCE), a gateway (GW), a mobile management entity (MME), an evolved universal terrestrial radio access network (EUTRAN), and an operation administration and maintenance (OAM) manager.

Optionally, the first type subframes may specifically be the SL synchronization subframes.

From the description of the embodiment described above, it will be apparent to those skilled in the art that the methods in the embodiment described above may be implemented by software plus a necessary general-purpose hardware platform, or may of course be implemented by hardware. However, in many cases, the former is a preferred implementation mode. Based on this understanding, the solution provided by the present disclosure substantially, or the part contributing to the related art, may be embodied in the form of a software product. The computer software product is stored in a storage medium (such as a read-only memory (ROM)/a random access memory (RAM), a magnetic disk or an optical disk) and includes several instructions for enabling a terminal device (which may be a mobile phone, a computer, a server, a network device or the like) to execute the method according to each embodiment of the present disclosure.

Embodiment 2

This embodiment further provides a subframe configuration device. The device is configured to implement the above-mentioned embodiments and preferred implementation modes. What has been described will not be repeated. As used below, the term "module" may be software, hardware or a combination thereof capable of implementing predetermined functions. The devices in the embodiments described below are preferably implemented by software, but implementation by hardware or by a combination of software and hardware is also possible and conceived.

Figure 5:
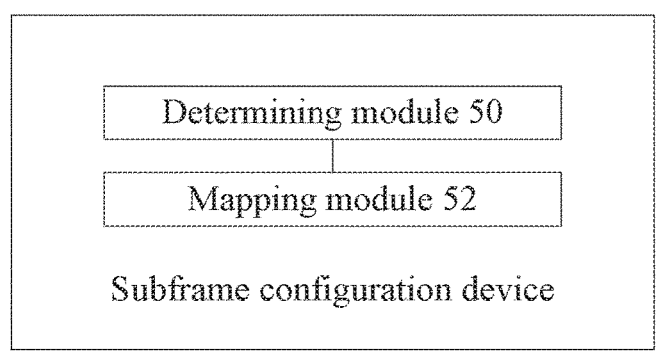
FIG. 5 is a block diagram of a subframe configuration device according to an embodiment of the present disclosure.

FIG. 5 is a block diagram illustrating a subframe configuration device according to an embodiment of the present disclosure. As shown in FIG. 5, the device includes a determining module 50 and a mapping module 52.

The determining module 50 is configured to determine a configuration of second type subframes according to a configuration of first type subframes and a bitmap sequence of subframe configuration of a resource pool, where the second type subframes are reserved subframes. As a preferable implementation mode, mapping of the bitmap sequence is not performed on the reserved subframes. That is, no mapping of the bitmap sequence is performed on the second type subframes.

The mapping module 52 is configured to map the bitmap sequence of subframe configuration of the resource pool according to the configuration of the first type subframes and the configuration of the second type subframes.

Optionally, the first type subframes include sidelink (SL) synchronization subframes and/or offset subframes. The SL synchronization subframes refer to subframes for sending SL synchronization signals, and the offset subframes refer to Ne continuous subframes starting from a subframe with a smallest system subframe sequence number, where Ne is a quantity of offset subframes, the quantity of offset subframes Ne is configured by the network side or is predefined in the system, and Ne is a non-negative integer. The configuration of the second type subframes refer to the quantity and/or positions of the second type subframes within a range of system subframe sequence numbers.

Optionally, the determining module includes a first determining unit and a second determining unit. The first determining unit is configured to determine the quantity Nr of the second type subframes according to the quantity $N_0$ of the first type subframes and a length L of the bitmap sequence, where Nr is equal to a modulo calculation result of the quantity Ns of basic subframes by the length L of the bitmap sequence, that is Nr=Ns mod L, mod is a modulo operator, the basic subframes are remaining subframes obtained by excluding the first type subframes from all system subframes within the range of system subframe sequence numbers, $N_0$ and Nr are non-negative integers, and L is a positive integer. The second determining unit is configured to determine positions of the second type subframes according to a rule which is configured by a network side or is predefined.

Specifically, the rule includes at least one of:

starting from a subframe with a smallest sequence number in system subframes, Nr continuous subframes whose subframe sequence numbers are incremented are noted as the second type subframes, where Nr is the quantity of the second type subframes;

starting from a subframe with a biggest sequence number in the system subframes, Nr continuous subframes whose subframe sequence numbers are decremented are noted as the second type subframes;

in the system subframes, starting from a first designated subframe, Nr continuous subframes whose subframe sequence numbers are incremented or decremented are noted as the second type subframes, where the first designated subframe is predefined by a system or is indicated by network side configuration;

in sequentially numbered basic subframes, starting from a subframe with a smallest sequence number in the basic subframes, Nr continuous subframes whose subframe sequence numbers are incremented are noted as the second type subframes, where the basic subframes are remaining subframes obtained by excluding the first type subframes from all system subframes within a range of system subframe sequence numbers;

in the sequentially numbered basic subframes, starting from a subframe with a biggest sequence number in the basic subframes, Nr continuous subframes whose subframe sequence numbers are decremented are noted as the second type subframes;

in the sequentially numbered basic subframes, starting from a second designated subframe, Nr continuous subframes whose subframe sequence numbers are incremented or decremented are noted as the second type subframes, where the second designated subframe is predefined in the system or is indicated by the network side;

in the sequentially numbered basic subframes, subframes whose subframe sequence numbers are a+b*T are noted as the second type subframes, where T is equal to a result of rounding down a division of Ns by Nr, that is T=floor (Ns/Nr), floor (·) is a floor function, a is a non-negative integer, and b=[0, 1, 2, . . . Nr−1] or b=[1, 2, 3, . . . Nr];

in the sequentially numbered basic subframes, subframes whose subframe sequence numbers are a+b*L are noted as the second type subframes, where L is a length of the bitmap sequence; and subframes with system subframe sequence numbers $S_i$ are predefined as the second type subframes, where i=[0, 1, 2, . . . Nr−1].

It is to be noted that the preceding modules may be implemented by software or hardware. Implementation by hardware may, but may not necessarily, be performed in the following manner: the preceding modules are located in a same processor, or the preceding modules are located in any combination in different processors.

Embodiment 3

This embodiment is an optional embodiment of the present disclosure, used for describing the present application in detail in conjunction with examples.

Figure 6:
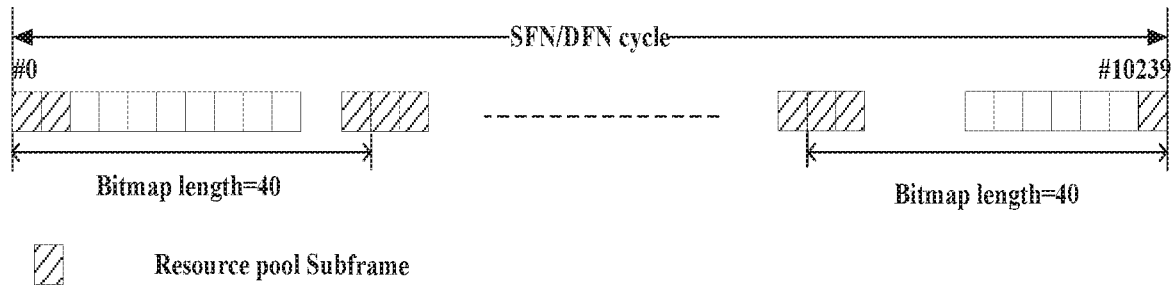
FIG. 6 is a schematic diagram illustrating a bitmap mapping of subframes in a resource pool according to an embodiment of the present disclosure.

In a resource pool configuration of a sidelink in this embodiment, the resource pool includes one or more subframes, and the one or more subframes included in the resource pool are indicated through a subframe bitmap sequence. According to a bitmap sequence indicated by a base station or pre-configured in a system, the bit bitmap sequence is mapped starting from a subframe position whose system frame number (SFN) is #0. In general, when an indication bit of the bitmap sequence of a corresponding subframe configuration is "1", this subframe is the subframe in the resource pool, and when the indication bit is "0", this subframe is not used as the subframe in the resource pool. The bitmap sequence of the subframe configuration is repeatedly mapped within a range of system subframe sequence numbers, so that the configuration indication of the subframes in the resource pool is implemented. FIG. 6 is a schematic diagram illustrating a bitmap mapping of subframes in a resource pool according to an embodiment of the present disclosure. As shown in FIG. 6, a bitmap sequence having a length of 40 bits is used for indicating the subframe configuration in the resource pool. Starting from SFN (or a direct frame number, DFN)=0, the subframe configuration is mapped according to the configured bitmap sequence. The subframe configuration whose corresponding indication bit is "1" is the subframe in the resource pool. The bitmap mapping is repeatedly mapped within a SFN/DFN cycle.

Figure 7:
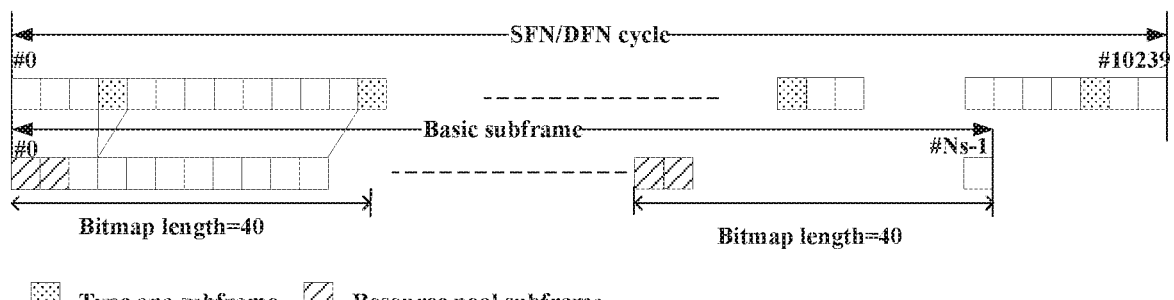
FIG. 7 is a schematic diagram one illustrating a bitmap mapping of subframes in a resource pool on basic subframes according to an embodiment of the present disclosure.

In the system, the first type subframes may be configured for the sidelink, such as sidelink synchronization subframes (SLSSs). Within a range of system subframe sequence number, one or more first type of subframes are configured. Furthermore, the mapping of the bitmap sequence in the resource pool is not performed on the first type subframes. When the first type subframes are configured in the system, within the range of system subframe sequence numbers, remaining subframes obtained by excluding the first type subframes are called basic subframes. The basic subframes are numbered sequentially, and the bitmap sequence of subframe configuration of the resource pool is mapped on the basic subframes. FIG. 7 is a schematic diagram one illustrating a bitmap mapping of subframes in a resource pool on basic subframes according to an embodiment of the present disclosure. As shown in FIG. 7, the bitmap sequence having the length of 40 bits is used for indicating the subframes in the resource pool. Starting from SFN (or DFN)=0, the bitmap sequence is mapping on the basic subframes. The subframes corresponding indication bit is "1" is the subframe in the resource pool. The bitmap sequence is repeatedly mapped within the SFN/DFN cycle.

In the process of mapping the subframes in the resource pool, there are N subframes within the range of the system subframe sequence numbers in total, and N=10240. The quantity of the configured first type subframes is $N_0$, the quantity of the basic subframes is the quantity of the system subframes minus the quantity of the first type subframes, that is, $$Ns=N-N_0.$$

Figure 8:
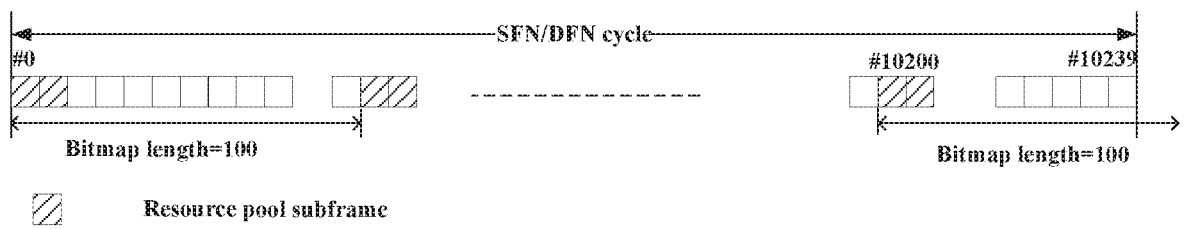
FIG. 8 is a schematic diagram two illustrating a bitmap mapping of subframes in a resource pool on basic subframes according to an embodiment of the present disclosure.

The length of the bitmap sequence configured by subframes in the resource pool is L. L is a system-configurable value, such as 16, 20 and 100. Therefore, L may not be divided exactly by N or Ns. That is, the repeated mapping of the bitmap sequence within the range of system subframe sequence numbers cannot guarantee the complete mapping an integer number of times on the basic subframes. FIG. 8 is a schematic diagram two illustrating a bitmap mapping of subframes in a resource pool on basic subframes according to an embodiment of the present disclosure. As shown in FIG. 8, when the first type subframes are not configured, that is, $N_0=0$, Ns=N=10240. When the system uses the bitmap sequence with the length L of 100, 10240 cannot be divided exactly by 100. Therefore, the bitmap sequence cannot be mapped an integer number of times on the basic subframes.

In order to map the bitmap sequence configured by the subframes in the resource pool an integer number of times on the basic subframes, the second type subframes, which may also called reserved subframes, need to be configured in the basic subframes. The configuration of the reserved subframes is determined according to the configuration of the first type subframes and the bitmap sequence of subframe configuration of the resource pool.

The configuration of the reserved subframes include the quantity and/or positions of the reserved subframes within the range of system subframe sequence numbers.

First, the quantity of the reserved subframes is determined.

The quantity Nr of the reserved subframes is determined according to the quantity $N_0$ of the first type subframes and the length L of the bitmap sequence:

$$Nr=Ns \bmod L$$

Second, the positions of the reserved subframes are determined.

The positions of the reserved subframes are determined according to a rule which is configured by the network side or is predefined. Specifically, the rule includes at least one of:

starting from a subframe with a smallest sequence number in system subframes, Nr continuous subframes whose subframe sequence numbers are incremented are noted as the second type subframes, where Nr is the quantity of the second type subframes;

starting from a subframe with a biggest sequence number in the system subframes, Nr continuous subframes whose subframe sequence numbers are decremented are noted as the second type subframes;

in the system subframes, starting from a first designated subframe, Nr continuous subframes whose subframe sequence numbers are incremented or decremented are noted as the second type subframes, where the first designated subframe is predefined in the system or is indicated by network side;

in sequentially numbered basic subframes, starting from a subframe with a smallest sequence number in the basic subframes, Nr continuous subframes whose subframe sequence numbers are incremented are noted as the second type subframes, where the basic subframes are remaining subframes obtained by excluding the first type subframes from all system subframes within a range of system subframe sequence numbers;

in the sequentially numbered basic subframes, starting from a subframe with a biggest sequence number in the basic subframes, Nr continuous subframes whose subframe sequence numbers are decremented are noted as the second type subframes;

in the sequentially numbered basic subframes, starting from a second designated subframe, Nr continuous subframes whose subframe sequence numbers are incremented or decremented are noted as the second type subframes, where the second designated subframe is predefined in the system or is indicated by the network side;

in the sequentially numbered basic subframes, subframes whose subframe sequence numbers are a+b*T are noted as the second type subframes, where T is equal to a result of rounding down a division of Ns by Nr, that is T=floor(Ns/Nr), floor (·) is a floor function, a is a non-negative integer, and b=[0, 1, 2, . . . Nr−1] or b=[1, 2, 3, . . . Nr];

in the sequentially numbered basic subframes, subframes whose subframe sequence numbers are a+b*L are noted as the second type subframes, where L is a length of the bitmap sequence; and subframes with system subframe sequence numbers $S_i$ are predefined as the second type subframes, where i=[0, 1, 2, . . . Nr−1].

If not in collision, the above methods may be used in combination, which will be further described through specific examples described below.

The network side includes one or more of following entities: an evolved NodeB (eNB), a relay node (RN), a multicell coordination entity (MCE), a gateway (GW), a mobile management entity (MME), an evolved universal terrestrial radio access network (EUTRAN), and an operation administration and maintenance (OAM) manager. The following description is made using an example in which an eNB is used as a network side entity.

Example 1

In a vehicle-to-Everything (V2X) system, since the eNB is configured not to set SLSS subframes through higher layer signaling, the mapping indication of subframes in the V2X resource pool may be performed on all uplink subframes in the system, that is Ns=N=10240.

When the eNB configures the SLSS subframes through higher layer signaling and the quantity No of the SLSS subframes is 64, the quantity Ns of the basic subframes on which the mapping indication of subframes in the V2X resource pool may be performed in the system, Ns=N−$N_0$=10176.

When the eNB configures the SLSS subframes through higher layer signaling and the quantity No of the SLSS subframes is 128, the quantity Ns of the basic subframes on which the mapping indication of subframes in the V2X resource pool may be performed in the system is, Ns=N−$N_0$=10112.

When the length L of the bitmap sequence configured by the subframes in the V2X resource pool may be configured as 16 bits, 20 bits or 100 bits, the quantity Nr of the second type subframes (that is, the reserved subframes) may be determined according to both the configuration of the first type subframes and the length of the bitmap sequence, as shown in Table 1.

TABLE 1

| Bitmap length | Quantity Nr of the reserved subframes | | |
|---|---|---|---|
| | Ns = 10240 | Ns = 10176 | Ns = 10112 |
| 16 | 0 | 0 | 0 |
| 20 | 0 | 16 | 12 |
| 100 | 40 | 76 | 12 |

When the eNB configures the SLSS subframes through higher layer signaling, the quantity $N_0$ of the SLSS subframes is 64, and when the bitmap mapping of a resource pool has a starting mapping offset, a subframe offset Ne=20. Therefore, the quantity Ns of the basic subframes on which the mapping indication of subframes in the V2X resource pool may be performed in the system is Ns=N−$N_0$−Ne=10156. The quantity of the reserved subframes corresponding to different bitmap lengths is shown in Table 2.

TABLE 2

| Bitmap length | Quantity Nr of the reserved subframes |
|---|---|
| 16 | 12 |
| 20 | 16 |
| 100 | 56 |

Example 2

A rule for determining the positions of the reserved subframes predefined in the system is that, starting from a subframe with a smallest sequence number in the system subframes, Nr continuous subframes whose subframe sequence numbers are incremented are the reserved subframes.

Figure 9:
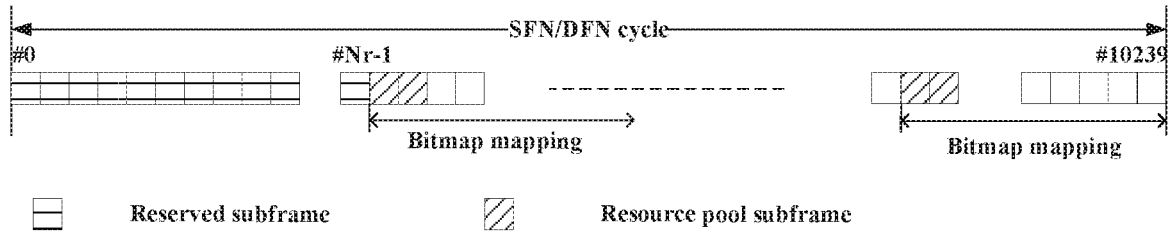
FIG. 9 is a schematic diagram illustrating a mapping according to an example 2 of the present disclosure.

FIG. 9 is a schematic diagram illustrating a mapping according to an example 2 of the present disclosure. As shown in FIG. 9, according to the quantity Nr of the reserved subframes, Nr continuous subframes [#0, . . . # Nr−1] starting from the system subframe sequence number #0 are noted as the reserved subframes, and the mapping of the resource pool subframe bitmap sequence is not performed on the reserved subframes.

By determining the reserved subframes configuration, the quantity of subframes which can be used for mapping the bitmap sequence is exactly an integral multiple of the length of the bitmap sequence, continuous bitmap mapping indications are implemented, and the subframe configuration in the resource pool is repeated cyclically, thereby benefiting stable delay of the UE using the subframes in the resource pool, and guaranteeing continuity of scheduling and usage of resources.

Example 3

A rule for determining the positions of the reserved subframes predefined in the system is that, starting from a subframe with a biggest sequence number in the basic subframes, Nr continuous subframes whose subframe sequence numbers are decremented are the reserved subframes.

Figure 10:
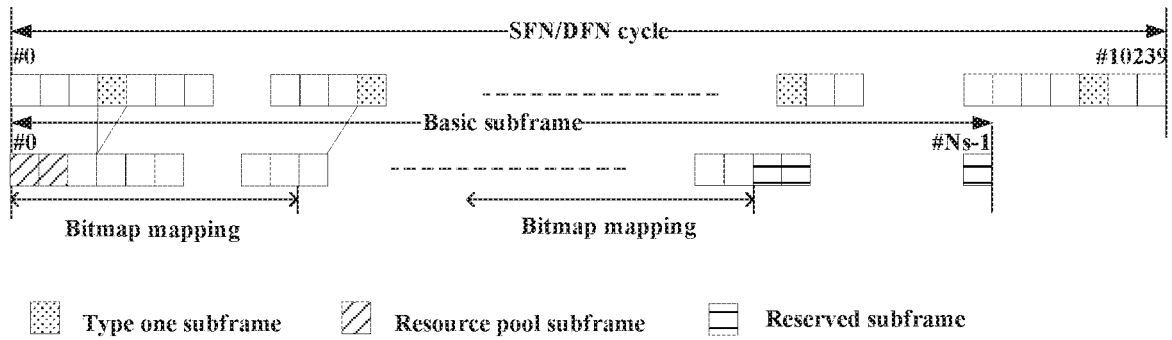
FIG. 10 is a schematic diagram illustrating a mapping according to an example 3 of the present disclosure.

FIG. 10 is a schematic diagram of a mapping according to an example 3 of the present disclosure. As shown in FIG. 10, according to the quantity Nr of the reserved subframes, Nr continuous subframes [# Ns−Nr, . . . # Ns−1] ending with a system with a subframe sequence number # Ns−1 are noted as the reserved subframes, and the mapping of the resource pool subframe bitmap sequence is not performed on the reserved subframes.

Example 4

A rule for determining the positions of the reserved subframes predefined in the system is that, in the sequentially numbered basic subframes, subframes whose subframe sequence numbers are a+b*T are noted as the reserved subframes, where $$T = \left\lfloor \frac{Ns}{Nr} \right\rfloor,$$

a=0, and b=[0, 1, . . . , Nr−1].

Figure 11:
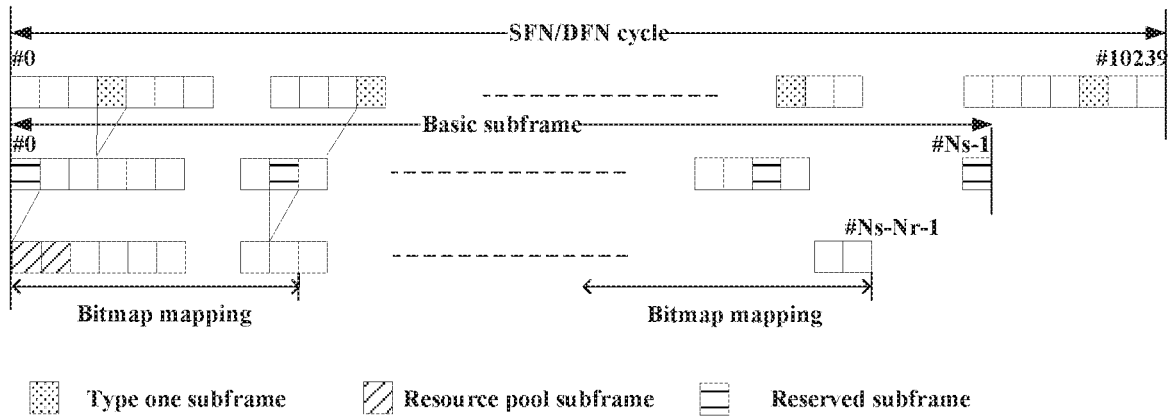
FIG. 11 is a schematic diagram illustrating a mapping according to an example 4 of the present disclosure.

FIG. 11 is a schematic diagram illustrating a mapping according to an example 4 of the present disclosure. As shown in FIG. 11, according to the quantity Nr of the reserved subframes, the Nr reserved subframes are evenly distributed within a range of basic subframes, and a subframe interval between adjacent two subframes is T. That is, subframes [# a, # a+T, . . . , # a+T*(Nr−1)] are noted as the reserved subframes, and the mapping of the resource pool subframe bitmap sequence is not performed on the reserved subframes.

Example 5

A rule for determining the positions of the reserved subframes indicated by the eNB configuration is that, subframes whose subframe sequence numbers are a+b*L are noted as the reserved subframes, where 0≤a≤Ns−1, and b=[0, 1, . . . , Nr−1].

According to the quantity Nr of the reserved subframes, the reserved subframes are set at equal intervals according to the length of resource pool subframe bitmap sequence within the range of the basic subframes, and the subframe interval between the adjacent two reserved subframes is L. That is, subframes [# a, # a+L, # a+L*(Nr−1)] are noted as the reserved subframes, and the mapping of the resource pool subframe bitmap sequence is not performed on the reserved subframes.

Embodiment 4

The embodiments of the present disclosure further provide a storage medium. Optionally, in this embodiment, the storage medium may be configured to store program codes for executing steps described below.

In step S1, configuration of second type subframes is determined according to configuration of first type subframes and a subframe configuration bitmap sequence of a resource pool, where the first type subframes refer to subframes on which no mapping of the bitmap sequence is performed within a range of system subframe sequence numbers, and the configuration of the second type subframes refer to the quantity and/or positions of the second type subframes within the range of system subframe sequence numbers.

Optionally, in this embodiment, the storage medium may include, but is not limited to, a USB flash drive, a read-only memory (ROM), a random access memory (RAM), a mobile hard disk, a magnetic disk, an optical disk or another medium capable of storing program codes.

Optionally, in this embodiment, the processor executes the following step according to program codes stored in the storage medium: determining configuration of second type subframes according to configuration of first type subframes and a subframe configuration bitmap sequence of a resource pool, where the first type subframes refer to subframes on which no mapping of the bitmap sequence is performed within a range of system subframe sequence numbers, and the configuration of the second type subframes refer to the quantity and/or positions of the second type subframes within the range of system subframe sequence numbers.

Optionally, for specific examples in the embodiment, reference may be made to the examples described in the above-mentioned embodiments and optional embodiments, and repetition will not be made herein.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatuses, so that the modules or steps may be stored in a storage apparatus and executable by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

What is claimed is:

1. A subframe configuration method, comprising:
    determining a configuration of second type subframes according to a configuration of first type subframes and a bitmap sequence of subframe configuration of a resource pool, wherein the second type subframes are reserved subframes, and mapping of the bitmap sequence is not performed on the reserved subframes; and
    mapping the bitmap sequence of the subframe configuration of the resource pool according to the configuration of the first type subframes and the configuration of the second type subframes;
    wherein the configuration of the second type subframes refer to a quantity and positions of the second type subframes within a range of system subframe sequence numbers;
    wherein the determining the configuration of the second type subframes according to the configuration of the first type subframes and the bitmap sequence of the subframe configuration of the resource pool comprises:
        determining a quantity Nr of the second type subframes according to a quantity $N_O$ of the first type subframes and a length L of the bitmap sequence;
        wherein Nr is equal to a modulo calculation result of a quantity Ns of basic subframes by the length of L of the bitmap sequence, wherein the basic subframes are remaining subframes obtained by excluding the first type subframes from all system subframes within a range of system subframe sequence numbers, $N_O$ and Nr are non-negative integers, and L is a positive integer.

2. The method of claim 1, wherein the first type subframes comprise:
    sidelink synchronization subframes and/or offset subframes, wherein the sidelink synchronization subframes refer to subframes for sending a sidelink synchronization signal;
    wherein the offset subframes refer to Ne continuous subframes starting from a subframe with a smallest system subframe sequence number, wherein Ne is a quantity of the offset subframes, the quantity of the offset subframes Ne is configured by a network side or is predefined in a system, and Ne is a non-negative integer.

3. The method of claim 1, wherein the determining the configuration of the second type subframes according to the configuration of first type subframes and the bitmap sequence of the subframe configuration of the resource pool further comprises:
    determining positions of the second type subframes according to a rule which is configured by a network side or is predefined.

4. The method of claim 3, wherein the rule comprises at least one of:
    starting from a subframe with a smallest sequence number in system subframes, Nr continuous subframes whose subframe sequence numbers are incremented are noted as the second type subframes, wherein Nr is a quantity of the second type subframes;
    starting from a subframe with a biggest sequence number in the system subframes, Nr continuous subframes whose subframe sequence numbers are decremented are noted as the second type subframes;
    in the system subframes, starting from a first designated subframe, Nr continuous subframes whose subframe sequence numbers are incremented or decremented are noted as the second type subframes, wherein the first designated subframe is predefined in system or is indicated by network side;
    in sequentially numbered basic subframes, starting from a subframe with a smallest sequence number in the basic subframes, Nr continuous subframes whose subframe sequence numbers are incremented are noted as the second type subframes, wherein the basic subframes are remaining subframes obtained by excluding the first type subframes from all system subframes within a range of system subframe sequence numbers;
    in the sequentially numbered basic subframes, starting from a subframe with a biggest sequence number in the basic subframes, Nr continuous subframes whose subframe sequence numbers are decremented are noted as the second type subframes;
    in the sequentially numbered basic subframes, starting from a second designated subframe, Nr continuous subframes whose subframe sequence numbers are incremented or decremented are noted as the second type subframes, wherein the second designated subframe is predefined in the system or is indicated by the network side;
    in the sequentially numbered basic subframes, subframes whose subframe sequence numbers are a=b*T are noted as the second type subframes, wherein T is equal to a result of rounding down a division of Ns by Nr, a is a non-negative integer, and b=[0,1,2, . . . Nr−1] or b=[1, 2,3, . . . Nr];

in the sequentially numbered basic subframes, subframes whose subframe sequence numbers are a+b*L are noted as the second type subframes, wherein L is a length of the bitmap sequence; and subframes with system subframe sequence numbers $S_i$ are predefined as the second type subframes, wherein i=[0, 1, 2, . . . Nr−1].

5. The method of claim 3, wherein the network side comprises at least one of: an evolved NodeB (eNB), a relay node (RN), a multicell coordination entity (MCE), a gateway (GW), a mobile management entity (MME), an evolved universal terrestrial radio access network (EUTRAN), and an operation administration and maintenance (OAM) manager.

6. A subframe configuration device, comprising:
at least one processor; and
a memory communicably connected with the at least one processor and configured for storing computer-executable instructions executable by the at least one processor;
wherein the computer-executable instructions when executed by the at least one processor causes the at least one processor to perform:
determining a configuration of second type subframes according to a configuration of first type subframes and a bitmap sequence of subframe configuration of a resource pool, wherein the second type subframes am reserved subframes, and mapping of the bitmap sequence is not performed on the reserved subframes; and
mapping the bitmap sequence of subframe configuration of the resource pool according to tire configuration of the first type subframes and the configuration of the second type subframes;
wherein the configuration of the second type subframes refer to a quantity and/or positions of the second type subframes within a range of system subframe sequence numbers;
at least one processor is further configured to determine a quantity Nr of the second type subframes according to a quantity $N_0$ of the first type subframes and a length L of the bitmap sequence;
wherein Nr is equal to a modulo calculation result of a quantity Ns of basic subframes by the length L of the bitmap sequence, wherein the basic subframes are remaining subframes obtained by excluding the first type subframes from all a system subframes within a range of system subframe sequence numbers $N_0$ and Nr are non-negative integers, and L is a positive integer.

7. The device of claim 6, wherein the first type subframes comprise:
sidelink synchronization subframes and offset subframes, wherein the sidelink synchronization subframes refer to subframes for sending a sidelink synchronization signal;
wherein the offset subframes refer to Ne continuous subframes starting from a subframe with a smallest system subframe sequence number, wherein Ne is a quantity of the offset subframes, the quantity of the offset subframes Ne is configured by a network side or is predefined in a system, and Ne is a non-negative integer.

8. The device of claim 6, wherein the at least one processor is further configured to determine positions of the second type subframes according to a rule which is configured by a network side or is predefined.

9. The device of claim 8, wherein the rule comprises at least one of:
starting from a subframe with a smallest sequence number in system subframes, Nr continuous subframes whose subframe sequence number are incremented are noted as the second type subframes, wherein Nr is a number of the second type subframes;
starting from a subframe with a biggest sequence number in the system subframes, Nr continuous subframes whose subframe sequence number are decremented are noted as the second type subframes;
in the system subframes, starting from a first designated subframe, Nr continuous subframes whose subframe sequence number are incremented or decremented are noted as the second type subframes, wherein the first designated subframe is predefined in a system or is indicated by network side;
in sequentially numbered basic subframes, starting from a subframe with a smallest sequence number in the basic subframes, Nr continuous subframes whose subframe sequence number are incremented are noted as the second type subframes, wherein the basic subframes are remaining subframes obtained by excluding the first type subframes from all system subframes within a range of system subframe sequence numbers;
in the sequentially numbered basic subframes, starting from a subframe with a biggest sequence number in the basic subframes, Nr continuous subframes whose subframe sequence number are decremented are noted as the second type subframes;
in the sequentially numbered basic subframes, starting front a second designated subframe, Nr continuous subframes whose subframe sequence number are incremented or decremented are noted as the second type subframes, wherein the second designated subframe is predefined in the system or is indicated by the network side;
in the sequentially numbered basic subframes, subframes whose subframe sequence numbers are a+b*T are noted as the second type subframes, wherein T is equal to a result of rounding down a division of Ns by Nr, a is a non-negative integer, and b=[0, 1, 2, . . . Nr−1] or b=[1, 2, 3, . . . Nr];
in the sequentially numbered basic subframes, subframes whose subframe sequence number are a+b*L are noted as the second type subframes, wherein L is a length of the bitmap sequence; and
subframes with system subframe sequence number $S_i$ are predefined as the second type subframes, wherein i=[0, 1, 2, . . . Nr−1].

10. The device of claim 6, wherein the first type subframes comprise:
sidelink synchronization subframes, wherein the sidelink synchronization subframes refer to subframes for sending a sidelink synchronization signal.

11. The device of claim 6, wherein the first type subframes comprise:
offset subframes, wherein the offset subframes refer to Ne continuous subframes starting from a subframe with a smallest system subframe sequence number, wherein Ne is a quantity of the offset subframes, the quantity of the offset subframes Ne is configured by a network side or is predefined in a system, and Ne is a non-negative integer.

* * * * *